(12) United States Patent
Takase et al.

(10) Patent No.: US 6,507,310 B2
(45) Date of Patent: Jan. 14, 2003

(54) RADAR DEVICE FOR DETECTING RESPONSE SIGNAL

(75) Inventors: Kazuyosi Takase, Tokyo (JP); Kioo Matuura, Tokyo (JP); Kenichi Nishiguchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/948,797

(22) Filed: Sep. 10, 2001

(65) Prior Publication Data

US 2002/0163462 A1 Nov. 7, 2002

(30) Foreign Application Priority Data

May 1, 2001 (JP) .................................. 2001-134428

(51) Int. Cl.$^7$ ............................................... G01S 13/74
(52) U.S. Cl. .............................. 342/43; 342/42; 342/44; 342/46
(58) Field of Search .......................... 342/42, 43, 44, 342/45, 46, 47, 48, 49, 50, 51, 175, 195, 41, 187

(56) References Cited

U.S. PATENT DOCUMENTS 4,075,632 A * 2/1978 Baldwin et al. ............ 342/50
5,448,242 A * 9/1995 Sharpe et al. .............. 342/42
5,450,087 A * 9/1995 Hurta et al. ................ 342/42
5,471,212 A * 11/1995 Sharpe et al. .............. 342/42
5,525,992 A * 6/1996 Froschermeier ............ 342/44
5,675,342 A * 10/1997 Sharpe ....................... 342/44

* cited by examiner

Primary Examiner—Bernarr E. Gregory
(74) Attorney, Agent, or Firm—Oblon, Spivak, McClelland, Maier & Neustadt, P.C.

(57) ABSTRACT

When a question signal of a transmitting frequency band $\Delta F1$ output from a radar device is received in search and rescue radar transponder (SART) of a wreck ship, a response signal is sent from the SART to the radar device. In the radar device, the response signal and an echo of the question signal are received as a reception signal, intensity of components of the reception signal placed in almost the same frequency band as the transmitting frequency band $\Delta F1$ of the question signal is suppressed to produce a filtered response signal, and components of he filtered response signal placed in a receiving frequency band $\Delta F2$, which does not overlap with the transmitting frequency band $\Delta F1$ of the question signal, are extracted from the filtered response signal as an image signal. Therefore, sea clutter and ground clutter indicated as the echo of the question signal is hardly included in the image signal, and a position of the wreck ship can be detected by using the image signal excellent in a signal-to-noise ratio. Accordingly, the radar device excellent in a detection performance of the position of the wreck ship can be obtained.

6 Claims, 7 Drawing Sheets

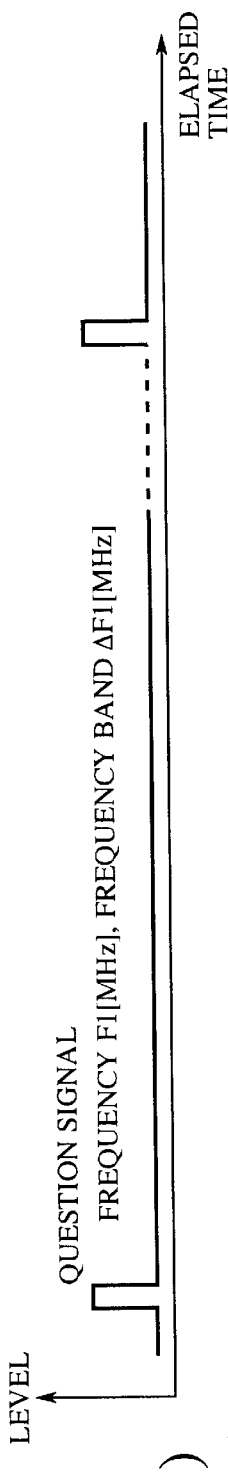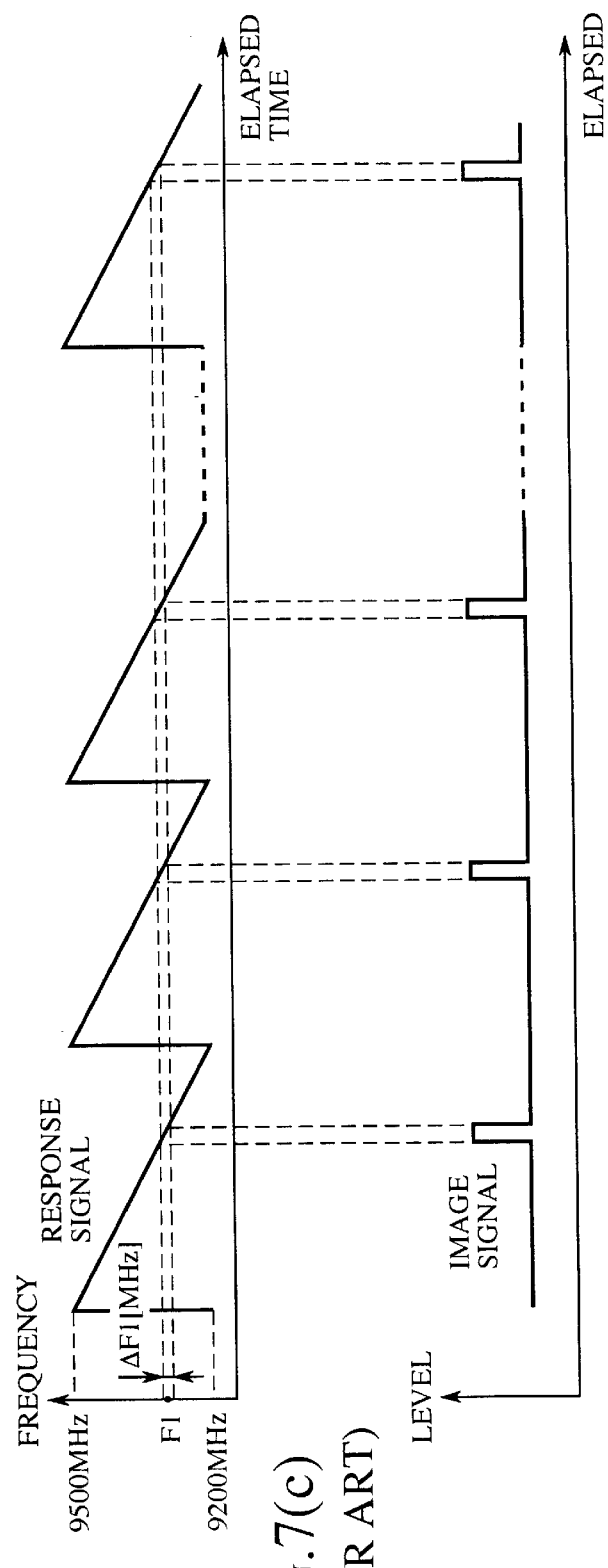
FIG.7(a) (PRIOR ART)
FIG.7(b) (PRIOR ART)
FIG.7(c) (PRIOR ART)

RADAR DEVICE FOR DETECTING RESPONSE SIGNAL

BACKGROUND OF THE INVENTION

1. Field of the Invention

The present invention relates to a radar device in which a response signal sent from a search and rescue radar transponder (SART) of a wreck ship is detected when a disaster occurs in the wreck ship at sea.

2. Description of Related Art

A search and rescue radar transponder (hereinafter, called SART) has been known as a search and rescue transceiver unit which exchanges signals with a radar device of a rescue ship. The operation of the SART mounted in a wreck ship is started when a disaster occurs in the wreck ship at sea, and the SART is set to a reception wait state to receive a question signal from a radar device mounted in the rescue ship. Thereafter, when the rescue ship approaches the wreck ship, the SART receives a question signal output from the radar device of the rescue ship, and the SART sends a response signal to the rescue ship in response to the question signal. Thereafter, in the wreck ship, to encourage crew-members of the wreck ship, the SART informs the crew-members of the reception of the question signal. Also, in the rescue ship, the response signal sent from the SART is analyzed in the radar device to detect a position of the wreck ship, and the rescue ship rescues the crew-members of the wreck ship.

FIG. 6 is a block diagram showing the configuration of a conventional radar device.

In FIG. 6, 101 indicates a conventional radar device mounted in a rescue ship. 102 indicates a signal producing unit for producing a question signal. 103 indicates an antenna for radiating the question signal and receiving both a response signal sent from an SART (not shown) and an echo of the question signal as a reception signal. The antenna 103 is always rotated to receive the response signal radiated from any direction. 105 indicates a signal receiving unit for analyzing the reception signal received in the antenna 103 by amplifying and phase-detecting the reception signal and producing an image signal indicating a position of the wreck ship. 106 indicates a circulator unit for sending the question signal produced in the signal producing unit 102 to the antenna 103 and sending the reception signal received in the antenna 103 to the signal receiving unit 105.

Next, an operation of the conventional radar device 101 will be described below.

In FIG. 6, a question signal is produced in the signal producing unit 102. In the circulator unit 106, the question signal produced in the signal producing unit 102 is sent toward the antenna 103. In the antenna 103, the question signal is radiated into the air.

When the question signal is received in the SART of the wreck ship, a response signal is output from the SART, and the response signal and an echo of the question signal are received as a reception signal in the antenna 103. The reception signal including the response signal is sent toward the signal receiving unit 105 by the function of the circulator unit 106. Thereafter, the reception signal including the response signal is amplified and phase-detected in the signal receiving unit 105 to obtain an image signal. Therefore, a position of the SART can be detected according to the image signal, and an operator can visually recognize the position of the SART. That is, a distance between the radar device 101 and the SART and a direction from the radar device 101 to the SART can be visually recognized.

The detection of the position of the SART is described in detail with reference to FIG. 7(a) to FIG. 7(c).

FIG. 7(a) shows the question signal radiated from the conventional radar device 101, FIG. 7(b) shows a frequency change in the response signal sent from the SART, and FIG. 7(c) shows the image signal obtained in the signal receiving unit 105.

As shown in FIG. 7(a), the question signal is composed of pulse waves, and each pulse wave of the question signal is produced by a carrier wave set in a frequency band $\Delta F1$ (MHz) centering around a frequency F1 (MHz). The pulse waves of the question signal are radiated from the antenna 103. In the SART, as shown in FIG. 7(b), the outputting of the response signal is started at a reception time of each pulse wave of the question signal. The response signal is obtained by repeatedly sweeping an oscillation frequency 12 times in a sweeping frequency band from 9500 MHz to 9200 MHz. Therefore, the response signal has 12 signal waves in each response time-period, and the frequency of each signal wave uniformly changes in a saw-toothed shape. The saw-toothed-shaped signal waves of the response signal are output to the radar device 101. The transmitting frequency band $\Delta F1$ of the question signal is placed within the sweeping frequency band of the response signal ranging from 9500 MHz to 9200 MHz.

Thereafter, in the signal receiving unit 105 of the radar device 101, as shown in FIG. 7(b) and FIG. 7(c), components of the reception signal having frequencies of the transmitting frequency band $\Delta F1$ are extracted from the reception signal including the response signal, and an image signal having a plurality of pulse waves are obtained. The pulse waves of the image signal are placed at equal time-intervals because the saw-toothed-shaped signal waves of the response signal are output from the SART at equal time-intervals. The image signal is called an SART code.

Here, because the antenna 103 is rotated at prescribed cycles, the intensity of the pulse waves of the image signal is changed at the prescribed cycles. Therefore, a direction from the radar device 101 to the SART is detected according to the intensity change of the pulse waves of the image signal. Also, because the response signal is output from the SART when the question signal output from the radar device 101 is received in the SART, a time delay occurs between the outputting of the question signal from the radar device 101 and the reception of the response signal in the radar device 101. Therefore, a distance between the radar device 101 and the SART is detected according to the time delay.

However, because the transmitting frequency band $\Delta F1$ of the question signal is placed within the receiving frequency band of the response signal, a large volume of sea clutter and ground clutter indicated as the echo of the question signal is included as noise components in the reception signal, a signal-to-noise ratio of the reception signal deteriorates. Also, because components of the reception signal placed in almost the same frequency band as the transmitting frequency band $\Delta F1$ of the question signal are extracted from the reception signal to produce the image signal, a large volume of sea clutter and ground clutter indicated as the echo of the question signal is included in the image signal. That is, the question signal is returned from the surface of the sea as the sea clutter, and the question signal is returned from the bottom of the sea as the ground clutter. Therefore, a problem has arisen that a detection performance of the position of the wreck ship is suppressed in the conventional radar device.

SUMMARY OF THE INVENTION

An object of the present invention is to provide, with due consideration to the drawbacks of the conventional radar device, a radar device in which a detection performance of the position of a wreck ship is improved.

The object is achieved by the provision of a radar device comprising a signal producing unit for producing a question signal, an antenna for outputting the question signal produced in the signal producing unit and receiving both an echo of the question signal and a response signal sent from a search and rescue radar trans-ponder in response to the question signal, a filtering unit for receiving both the echo of the question signal and the response signal received in the antenna and suppressing intensity of components of both the echo of the question signal and the response signal placed in almost the same frequency band as that of the question signal to produce a filtered response signal, a circulator unit for sending the question signal produced in the signal producing unit to the antenna and sending both the echo of the question signal and the response signal received in the antenna to the filtering unit, and a signal receiving unit for receiving the filtered response signal produced in the filtering unit and extracting components of the filtered response signal placed in a receiving frequency band, which does not overlap with the frequency band of the question signal, from the filtered response signal to obtain an image signal.

In the above configuration, because the intensity of components of both the echo of the question signal and the response signal placed in almost the same frequency band as that of the question signal is suppressed and reduced, the echo of the question signal included in the filtered response signal is considerably reduced. Also, because components of the filtered response signal placed in a receiving frequency band not overlapping with the frequency band of the question signal are extracted from the filtered response signal, the image signal hardly includes the echo of the question signal.

Therefore, noise components such as sea clutter and ground clutter indicated as the echo of the question signal are considerably reduced in the image signal. Accordingly, a signal-to-noise ratio in the image signal can be improved, and a detection performance of the position of a wreck ship due to the image signal can be improved.

It is preferred that intensity of components of both the echo of the question signal and the response signal placed in a frequency band other than the receiving frequency band is suppressed in the filtering unit to produce the filtered response signal.

Therefore, even though question signals and response signals sent from other radar devices and response signals for the question signals are received as noise components in the antenna, the noise components can be considerably reduced in the image signal. Accordingly, a detection performance of the position of a wreck ship due to the image signal can be further improved.

It is also preferred that the radar device further comprises a fixed attenuator for receiving a part of both the echo of the question signal and the response signal from the circulator unit and sending the part of both the echo of the question signal and the response signal to the signal receiving unit. Intensity of components of the other part of both the echo of the question signal and the response signal placed in almost the same frequency band as that of the question signal is suppressed in the filtering unit to produce the filtered response signal, the image signal is produced from the filtered response signal in the signal receiving unit, and the part of both the echo of the question signal and the response signal sent from the fixed attenuator and the image signal are combined with each other in the signal receiving unit.

Therefore, because the part of both the echo of the question signal and the response signal indicates peripheral conditions of the radar device, an operator can visually watch a position of a wreck ship with peripheral conditions of the radar device.

It is also preferred that the radar device further comprises a fixed attenuator for receiving a part of both the echo of the question signal and the response signal from the circulator unit and sending the part of both the echo of the question signal and the response signal to the signal receiving unit. Intensity of components of the other part of both the echo of the question signal and the response signal placed in a frequency band other than the receiving frequency band is suppressed in the filtering unit to produce the filtered response signal, the image signal is produced from the filtered response signal in the signal receiving unit, and the part of both the echo of the question signal and the response signal sent from the fixed attenuator and the image signal are combined with each other in the signal receiving unit.

Therefore, because the part of both the echo of the question signal and the response signal indicates peripheral conditions of the radar device, an operator can visually watch a position of a wreck ship with peripheral conditions of the radar device. Also, even though question signals and response signals sent from other radar devices and response signals for the question signals are received as noise components in the antenna, the noise components can be considerably reduced in the image signal.

It is also preferred that the radar device further comprises a variable attenuator for receiving a part of both the echo of the question signal and the response signal set to an adjusted electric power level from the circulator unit and sending the part of both the echo of the question signal and the response signal to the signal receiving unit to adjust an electric power level of the other part of both the echo of the question signal and the response signal sent from the circulator unit to the filtering unit. Intensity of components of the other part of both the echo of the question signal and the response signal placed in almost the same frequency band as that of the question signal is suppressed in the filtering unit to produce the filtered response signal, the image signal is produced from the filtered response signal in the signal receiving unit, and the part of both the echo of the question signal and the response signal sent from the fixed attenuator and the image signal are combined with each other in the signal receiving unit.

Therefore, because an electric power level of the part of both the echo of the question signal and the response signal is adjusted, brightness of an image of peripheral conditions of the radar device displayed in the radar device can be adjusted. Accordingly, a position of a wreck ship can be properly displayed with peripheral conditions of the radar device.

It is also preferred that the radar device further comprises a variable attenuator for receiving a part of both the echo of the question signal and the response signal set to an adjusted electric power level from the circulator unit and sending the part of both the echo of the question signal and the response signal to the signal receiving unit to adjust an electric power level of the other part of both the echo of the question signal and the response signal sent from the circulator unit to the filtering unit. Intensity of components of the other part of both the echo of the question signal and the response signal placed in a frequency band other than the receiving frequency band is suppressed in the filtering unit to produce the filtered response signal, the image signal is produced from the filtered response signal in the signal receiving unit, and the part of both the echo of the question signal and the response signal sent from the fixed attenuator and the image signal are combined with each other in the signal receiving unit.

Therefore, because an electric power level of the part of both the echo of the question signal and the response signal is adjusted, brightness of an image of peripheral conditions of the radar device displayed in the radar device can be adjusted. Accordingly, a position of a wreck ship can be properly displayed with peripheral conditions of the radar device.

Also, even though question signals and response signals sent from other radar devices and response signals for the question signals are received as noise components in the antenna, the noise components can be considerably reduced in the image signal.

BRIEF DESCRIPTION OF THE DRAWINGS

FIG. 7(a) shows a question signal radiated from the conventional radar device;

FIG. 7(b) shows a change of frequency in a response signal sent from an SART; and FIG. 7(c) shows an image signal obtained in a signal receiving unit.

DETAILED DESCRIPTION OF THE PREFERRED EMBODIMENTS

Embodiments of the present invention will now be described with reference to the accompanying drawings.
Embodiment 1

Figure 1:
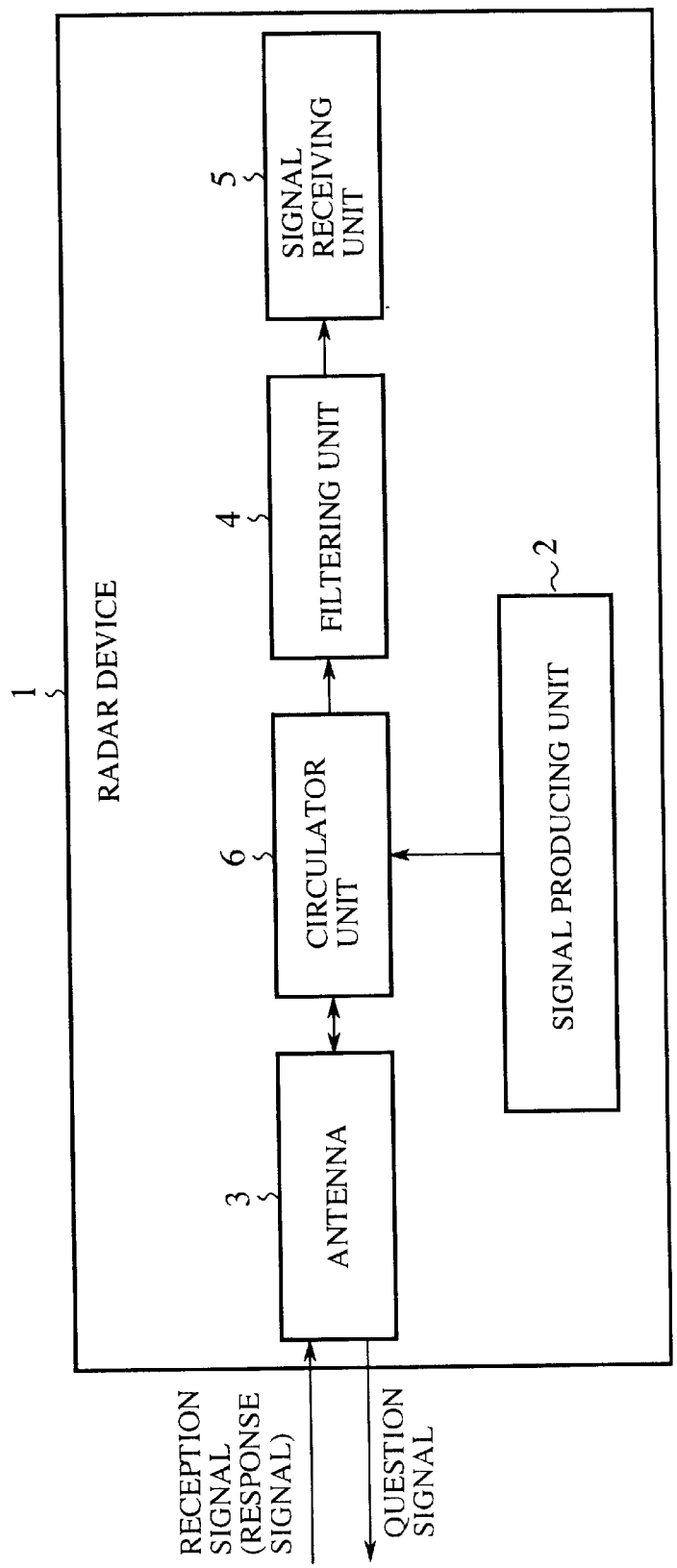
FIG. 1 is a block diagram showing the configuration of a radar device according to first and second embodiments of the present invention.

FIG. 1 is a block diagram showing the configuration of a radar device according to a first embodiment of the present invention.

In FIG. 1, 1 indicates a radar device mounted in a rescue ship. 2 indicates a signal producing unit for producing a question signal. 3 indicates an antenna for radiating the question signal and receiving both a response signal sent from an SART (not shown) and an echo of the question signal as a reception signal. The antenna 3 is always rotated to receive the response signal radiated from any direction. 4 indicates a filtering unit for reducing intensity of components of the reception signal placed in almost the same frequency band as that of the question signal to produce a filtered response signal. 5 indicates a signal receiving unit for analyzing the filtered response signal produced in the filtering unit 4 by amplifying and phase-detecting the filtered response signal and producing an image signal. 6 indicates a circulator unit for sending the question signal produced in the signal producing unit 2 to the antenna 3 and sending the reception signal received in the antenna 3 to the filtering unit 4.

Next, an operation of the radar device will be described below.

Figure 2A:
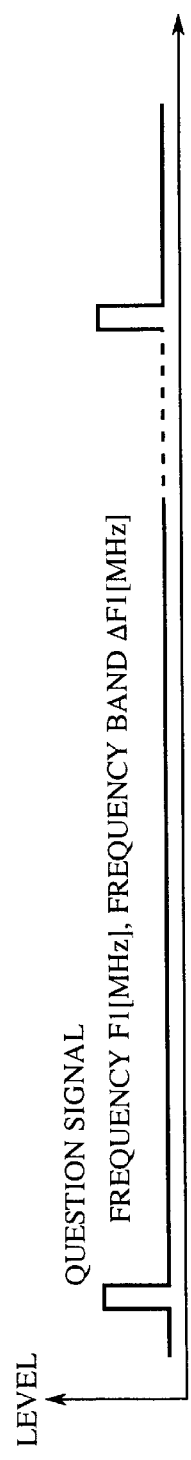
FIG. 2(a) shows a question signal radiated from the radar device.
Figure 2B:
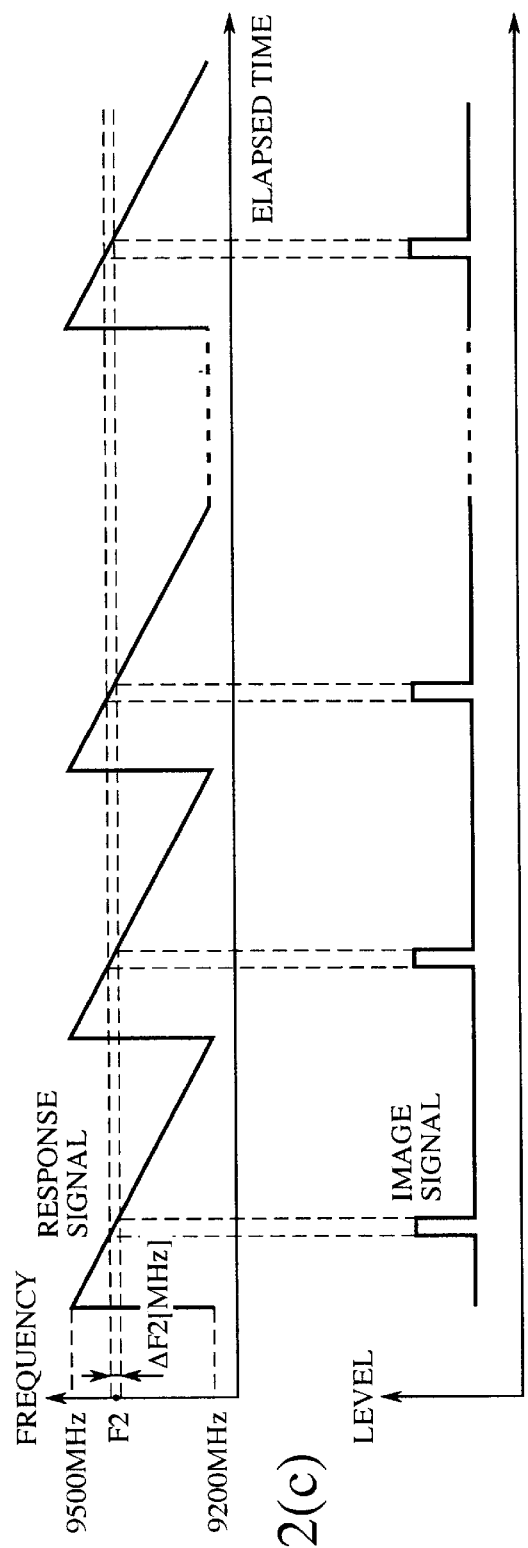
FIG. 2(b) shows a change of frequency in a response signal sent from an SART.
Figure 2C:
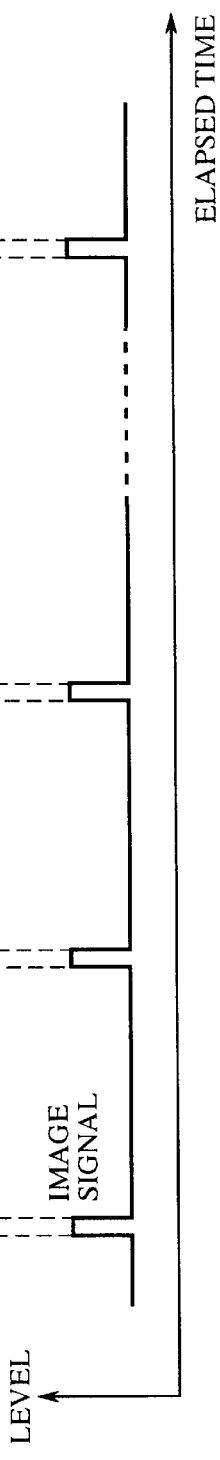
FIG. 2(c) shows an image signal obtained in a signal receiving unit.

FIG. 2(a) shows the question signal radiated from the radar device 1, FIG. 2(b) shows a change of frequency in the response signal sent from the SART, and FIG. 2(c) shows an image signal obtained in the signal receiving unit 5.

In FIG. 1, a question signal composed of pulse waves is produced in the signal producing unit 2 (refer to FIG. 2(a)). Each pulse wave of the question signal is produced by a carrier wave set in a transmitting frequency band ΔF1 (MHz) centering around a frequency F1 (MHz). In the circulator unit 6, the question signal produced in the signal producing unit 2 is sent toward the antenna 3. In the antenna 3, the question signal is radiated into the air.

When a question signal is received in the SART, a response signal (refer to FIG. 2(b)) is output from the SART, and the response signal and an echo of the question signal are received in the antenna 3 as a reception signal. Here, the response signal has a plurality of signal waves in the same manner as that shown in FIG. 7(b) in the conventional radar 101. That is, each signal wave of the response signal is produced by a carrier wave, and the frequency of the carrier wave uniformly decreased in a sweeping frequency range from 9500 MHz to 9200 MHz so as to form the signal waves of the response signal in a saw-toothed shape in frequency. Thereafter, the reception signal received in the antenna 3 is sent toward the filtering unit 4 by the function of the circulator unit 6. In the filtering unit 4, intensity of components of the reception signal placed in almost the same frequency band as the transmitting frequency band ΔF1 of the question signal is suppressed and reduced to produce a filtered response signal. Thereafter, in the signal receiving unit 5, components of the filtered response signal placed in a receiving frequency band ΔF2 (MHz) are extracted from the filtered response signal and are amplified and phase-detected to obtain an image signal denoting an SART code (refer to FIG. 2(c)). Here, the receiving frequency band ΔF2 does not overlap with the transmitting frequency band ΔF1 of the question signal. That is, the receiving frequency band ΔF2 is placed within the sweeping frequency band from 9500 MHz to 9200 MHz other than the transmitting frequency band ΔF1.

Therefore, a position of the SART can be detected according to the image signal, and an operator can visually recognize the position of the SART. That is, a distance between the radar device 1 and the SART and a direction from the radar device 1 to the SART can be visually recognized.

Figure 3:
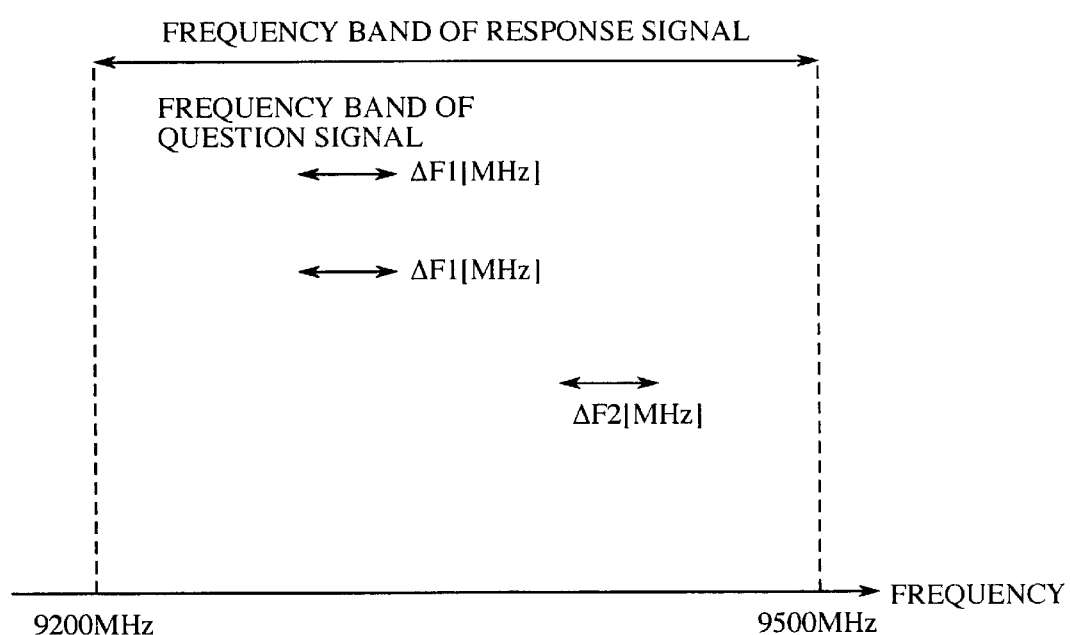
FIG. 3 is an explanatory view of both a transmitting frequency band ΔF1 of an image signal in the prior art and a receiving frequency-band ΔF2 of the image signal in the first embodiment in a sweeping frequency band ranging from 9500 MHz to 9200 MHz.

FIG. 3 is an explanatory view of both the transmitting frequency band ΔF1 of the image signal in the prior art and the receiving frequency band ΔF2 of the image signal in the first embodiment in the sweeping frequency band ranging from 9500 MHz to 9200 MHz.

Figure 6:
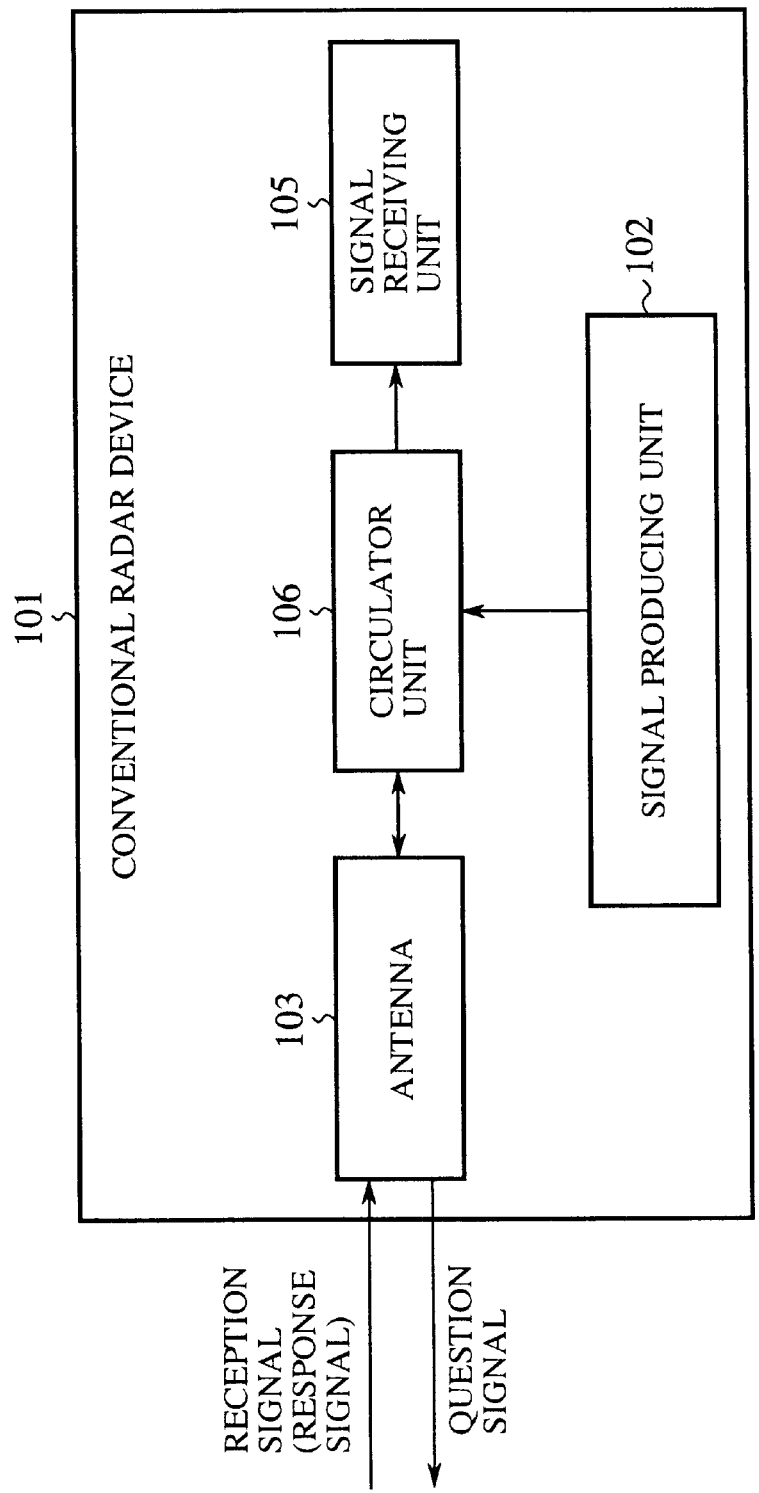
FIG. 6 is a block diagram showing the configuration of a conventional radar device.

In FIG. 3, a large volume of sea clutter and ground clutter indicated as the echo of the question signal is mainly included as noise components in the components of the reception signal placed in almost the same frequency band as the transmitting frequency band ΔF1 of the question signal. Therefore, in case of the conventional radar device 101 shown in FIG. 6, because components of the reception signal placed in almost the same frequency band as the frequency band ΔF1 of the question signal are extracted from the reception signal to produce the image signal, a large volume of sea clutter and ground clutter is included in the image signal. As a result, a signal-to-noise ratio in the image signal considerably deteriorates in the prior art.

In contrast, in the radar device 1 of the first embodiment, because intensity of components of the reception signal placed in almost the same frequency band as the transmitting frequency band ΔF1 of the question signal is suppressed and reduced in the filtering unit 4, a large volume of sea clutter and ground clutter included in the reception signal is considerably reduced in the filtered response signal, and only a considerably-reduced volume of sea clutter and ground clutter is included in the filtered response signal. Also, components of the filtered response signal placed in the receiving frequency band ΔF2, which does not overlap with the transmitting frequency band ΔF1 of the question signal, are extracted from the filtered response signal as the image signal. Therefore, sea clutter or ground clutter is hardly included in the image signal.

As is described above, in the first embodiment, intensity of components of the reception signal placed in almost the same frequency band as the transmitting frequency band ΔF1 of the question signal is suppressed and reduced to produce a filtered response signal, and components of the filtered response signal placed in the receiving frequency band ΔF2, which does not overlap with the transmitting frequency band ΔF1 of the question signal, are extracted from the filtered response signal as an image signal. Therefore, sea clutter or ground clutter indicated as the echo of the question signal is hardly included in the image signal. Therefore, the image signal is excellent in a signal-to-noise ratio. Accordingly, the radar device excellent in a detection performance of the position of the wreck ship can be obtained.

Embodiment 2

The configuration of a radar device is the same as that shown in FIG. 1, but the function of the filtering unit 4 according to a second embodiment differs from that according to the first embodiment.

In the filtering unit 4 according to the second embodiment, not only intensity of components of the reception signal placed in almost the same frequency band as the transmitting frequency band ΔF1 of the question signal is suppressed and reduced, but also intensity of components of the reception signal placed in the sweeping frequency band other than the receiving frequency band ΔF2 is suppressed and reduced. Therefore, even though question signals output from other radar devices and reception signals corresponding to the question signals are received in the antenna 3 of the radar device 1, the signals based on the other radar devices can be suppressed in the filtered response signal produced in the filtering unit 4. Therefore, not only sea clutter or ground clutter but also the signals due to the other radar devices are hardly included in the image signal.

As is described above, in the second embodiment, because intensity of components of the reception signal placed in the sweeping frequency band other than the receiving frequency band ΔF2 is suppressed and reduced, signals based on the other radar devices are suppressed in the filtered response signal produced in the filtering unit 4. Therefore, the image signal is further excellent in a signal-to-noise ratio. Accordingly, the radar device excellent in a detection performance of the position of the wreck ship can be obtained.

Embodiment 3

In third to sixth embodiments, peripheral conditions of the radar device 1 indicated by an echo of the question signal are additionally detected.

Figure 4:
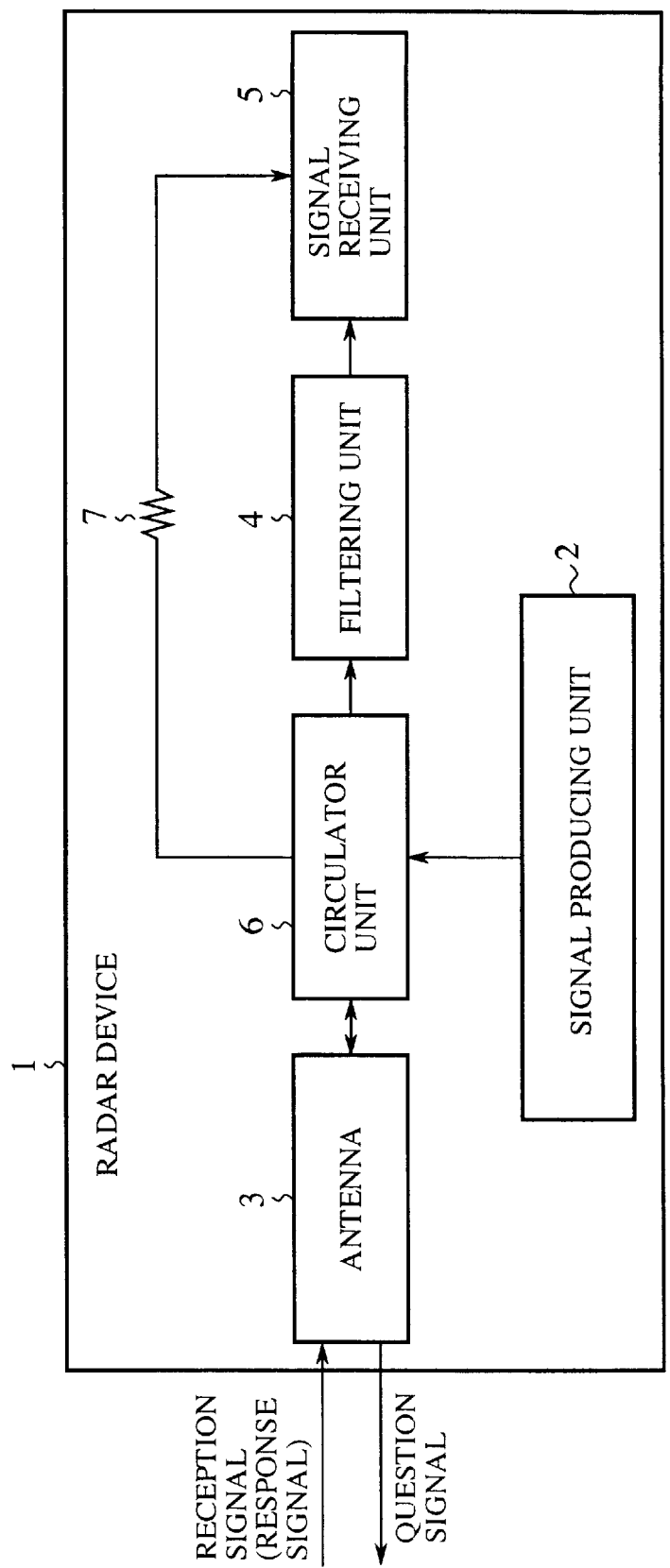
FIG. 4 is a block diagram showing the configuration of a radar device according to third and fourth embodiments of the present invention.

FIG. 4 is a block diagram showing the configuration of a radar device according to a third embodiment of the present invention. The constituent elements, which are the same as those shown in FIG. 1, are indicated by the same reference numerals as those of the constituent elements shown in FIG. 1, and additional description of those constituent elements is omitted.

In FIG. 4, 7 indicates a fixed attenuator having a fixed resistance value. The fixed attenuator 7 is arranged between the circulator unit 6 and the signal receiving unit 5 to be parallel to the filtering unit 4. In the third embodiment, the fixed attenuator 7 is additionally added to the radar device 1 of the first embodiment.

When such an echo of the question signal and the response signal are received in the antenna 3 as a reception signal, a part of the reception signal is sent to the signal receiving unit 5 through the circulator unit 6 and the fixed attenuator 7. Also, the other part of the reception signal is sent to the filtering unit 4 through the circulator unit 6, intensity of components of the other part of the reception signal placed in almost the same frequency band as the transmitting frequency band ΔF1 of the question signal is suppressed and reduced to produce a filtered response signal in the same manner as in the first embodiment, and the filtered response signal is sent to the signal receiving unit 5. Here, an electric power ratio of the part of the reception signal to the other part of the reception signal is determined according to the fixed resistance value of the fixed attenuator 7. Therefore, an electric power level of the filtered response signal obtained in the filtering unit 4 is attenuated by the function of the fixed attenuator 7 as compared with an electric power level of the filtered response signal produced according to the first embodiment.

Thereafter, components of the filtered response signal placed in the receiving frequency band ΔF2 are extracted from the filtered response signal, the extracted components of the filtered response signal are amplified and phase-detected in the signal receiving unit 5 to obtain an image signal denoting an SART code, and the image signal and the part of the reception signal are combined in the signal receiving unit 5 to produce a combined signal.

Therefore, because the image signal is included in the combined signal, a position of the SART is detected according to the image signal of the combined signal in the same manner as in the first embodiment, and an operator visually recognizes the position of the SART.

Also, because the part of the reception signal included in the combined signal is not filtered in the filtering unit 4, the echo of the question signal indicating peripheral conditions of the radar device 1 remains in the part of the reception signal. Therefore, the peripheral conditions of the radar device 1 are indicated by the part of the reception signal of the combined signal.

As is described above, in the third embodiment, the fixed attenuator 7 is arranged between the circulator unit 6 and the signal receiving unit 5 so as to be parallel to the filtering unit 4, a part of the reception signal is sent to the signal receiving unit 5 through the fixed attenuator 7 so as not to be filtered in the filtering unit 4, the image signal is produced from the other part of the reception signal transmitting through the filtering unit 4, and the part of the reception signal and the image signal are combined with each other to display a visual image to an operator according to a combined signal.

Therefore, a position of the SART is detected according to the image signal of the combined signal and is visually recognized, and the peripheral conditions of the radar device 1 are indicated by the part of the reception signal of the combined signal and are visually recognized. Accordingly, an operator can recognize the position of the SART with the peripheral conditions of the radar device 1.

Embodiment 4

The configuration of a radar device is the same as that shown in FIG. 4, but the function of the filtering unit 4 according to a fourth embodiment differs from that of the third embodiment but is the same as that of the second embodiment.

In detail, a part of the reception signal is sent to the signal receiving unit 5 through the circulator unit 6 and the fixed attenuator 7 without being filtered in the filtering unit 4. Also, the other part of the reception signal is sent to the filtering unit 4 through the circulator unit 6, intensity of components of the other part of the reception signal placed in the sweeping frequency band (ranging from 9500 MHz to 9200 MHz) other than the receiving frequency band $\Delta F2$ is suppressed and reduced to produce a filtered response signal, and the filtered response signal is sent to the signal receiving unit 5. In the signal receiving unit 5, an image signal is produced from the filtered response signal in the same manner as in the third embodiment.

As is described above, in the fourth embodiment, because intensity of components of the other part of the reception signal placed in the sweeping frequency band other than the receiving frequency band $\Delta F2$ is suppressed and reduced, the image signal is further excellent in a signal-to-noise ratio, and an operation can recognize the position of the SART with the peripheral conditions of the radar device 1.

Embodiment 5

Figure 5:
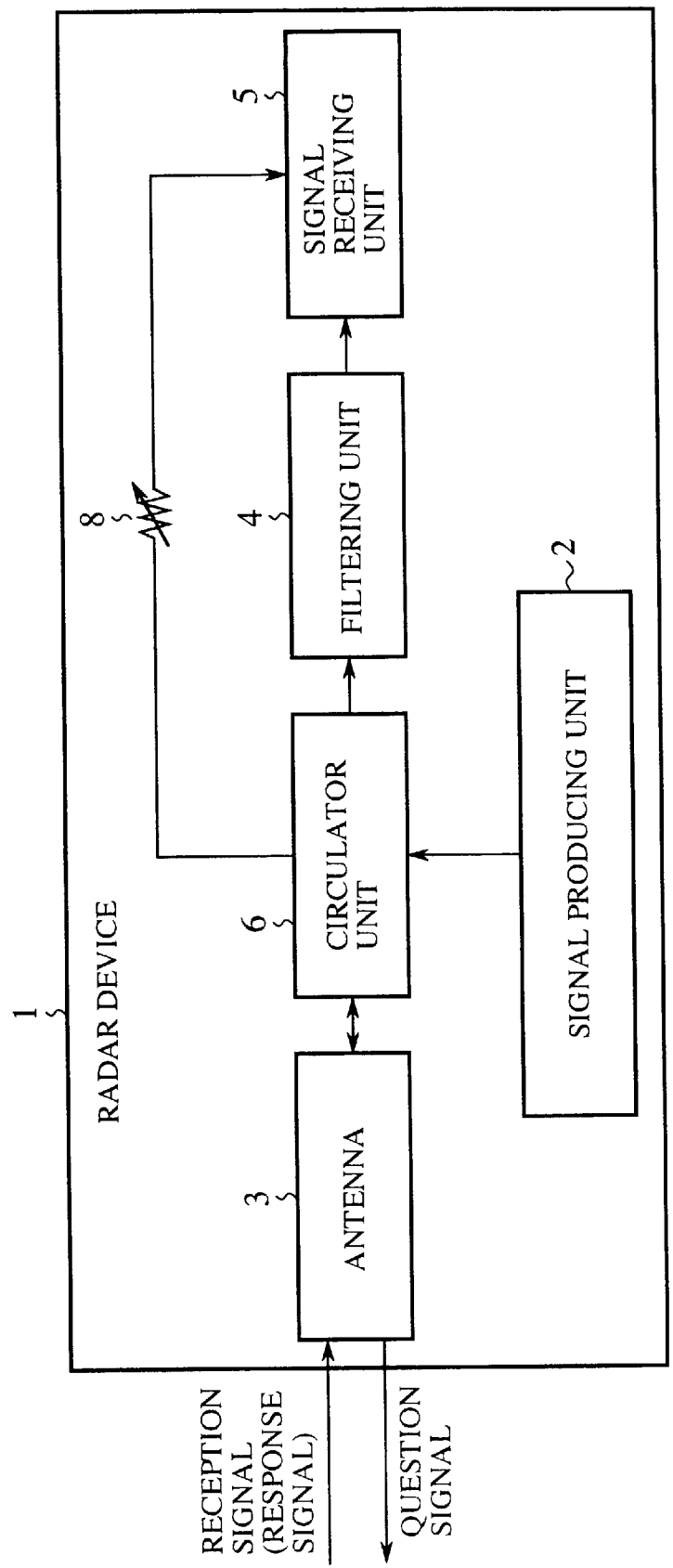
FIG. 5 is a block diagram showing the configuration of a radar device according to fifth and sixth embodiments of the present invention.

FIG. 5 is a block diagram showing the configuration of a radar device according to a fifth embodiment of the present invention. The constituent elements, which are the same as those shown in FIG. 1, are indicated by the same reference numerals as those of the constituent elements shown in FIG. 1, and additional description of those constituent elements is omitted.

In FIG. 5, 8 indicates a variable attenuator having a variable resistance value. The variable attenuator 8 is arranged between the circulator unit 6 and the signal receiving unit 5 to be parallel to the filtering unit 4. In the fifth embodiment, the variable attenuator 8 is additionally added to the radar device 1 of the first embodiment.

When a reception signal such as an echo of the question signal and the response signal is received in the antenna 3, a part of the reception signal is sent to the signal receiving unit 5 through the circulator unit 6 and the variable attenuator 8 without being filtered in the filtering unit 4. Also, the other part of the reception signal is sent to the filtering unit 4 through the circulator unit 6, intensity of components of the other part of the reception signal placed in almost the same frequency band as the transmitting frequency band $\Delta F1$ of the question signal is suppressed and reduced to produce a filtered response signal in the same manner as in the first embodiment, and the filtered response signal is sent to the signal receiving unit 5. Here, an electric power ratio of the part of the reception signal to the other part of the reception signal is determined according to the variable resistance value of the variable attenuator 8. Therefore, an electric power level of the filtered response signal obtained in the filtering unit 4 is adjusted and attenuated by changing the variable resistance value of the variable attenuator 8.

Thereafter, components of the filtered response signal placed in the receiving frequency band $\Delta F2$ are amplified and phase-detected in the signal receiving unit 5 to obtain an image signal denoting an SART code, and the image signal and the part of the reception signal are combined in the signal receiving unit 5 to produce a combined signal.

Therefore, because the image signal is included in the combined signal, a position of the SART is detected according to the image signal of the combined signal in the same manner as in the first embodiment, and an operator visually recognizes the position of the SART.

Also, because the part of the reception signal included in the combined signal is not filtered in the filtering unit 4, the echo of the question signal indicating peripheral conditions of the radar device 1 remains in the part of the reception signal. Therefore, the peripheral conditions of the radar device 1 are indicated by the combined signal including the part of the reception signal.

As is described above, in the fifth embodiment, the variable attenuator 8 is arranged between the circulator unit 6 and the signal receiving unit 5 so as to be parallel to the filtering unit 4, a part of the reception signal is transmitted through the variable attenuator 8 so as not to be filtered in the filtering unit 4, a filtered response signal is produced from the other part of the reception signal in the filtering unit 4, an image signal is produced from the other part of the reception signal in the signal receiving unit 5, and the part of the reception signal and the image signal are combined with each other to display a visual image to an operator according to a combined signal. Also, an electric power ratio of the part of the reception signal to the other part of the reception signal is adjusted according to the variable resistance value of the variable attenuator 8. Accordingly, brightness of a visual image of the SART and brightness of a visual image of the peripheral conditions of the radar device 1 can be appropriately adjusted, and an operator can appropriately recognize the position of the SART with the peripheral conditions of the radar device 1.

Embodiment 6

The configuration of a radar device 1 is the same as that shown in FIG. 5, but the function of the filtering unit 4 according to a sixth embodiment differs from that of the fifth embodiment but is the same as that of the second embodiment.

In detail, a part of the reception signal is sent to the signal receiving unit 5 through the circulator unit 6 and the variable attenuator 8 without-being filtered in the filtering unit 4. Also, the other part of the reception signal is sent to the filtering unit 4 through the circulator unit 6, intensity of components of the other part of the reception signal placed in the sweeping frequency band (ranging from 9500 MHz to 9200 MHz) other than the receiving frequency band $\Delta F2$ is suppressed and reduced to produce a filtered response signal, and the filtered response signal is sent to the signal receiving unit 5. In the signal receiving unit 5, an image signal is produced from the filtered response signal in the same manner as in the fifth embodiment.

As is described above, in the sixth embodiment, because intensity of components of the other part of the reception signal placed in the sweeping frequency band other than the receiving frequency band $\Delta F2$ is suppressed and reduced, the image signal is further excellent in a signal-to-noise ratio. Also, because brightness of a visual image of the SART and brightness of a visual image of the peripheral conditions of the radar device 1 are appropriately adjusted, an operation can appropriately recognize the position of the SART with the peripheral conditions of the radar device 1.

What is claimed is:

1. A radar device comprising:
   a signal producing unit for producing an interrogation signal;
   an antenna for outputting the interrogation signal produced in the signal producing unit and receiving both an echo of the interrogation signal and a response signal sent from a search and rescue radar transponder in response to the interrogation signal;
   a filtering unit for receiving both the echo of the interrogation signal and the response signal received in the antenna and suppressing intensity of components of both the echo of the interrogation signal and the response signal placed in almost the same frequency band as that of the interrogation signal to produce a filtered response signal;
   a circulator unit for sending the interrogation signal produced in the signal producing unit to the antenna and sending both the echo of the interrogation signal and the response signal received in the antenna to the filtering unit; and
   a signal receiving unit for receiving the filtered response signal produced in the filtering unit and extracting components of the filtered response signal placed in a receiving frequency band, which does not overlap with the frequency band of the interrogation signal, from the filtered response signal to obtain a position indicating signal displayed on a display device.

2. A radar device according to claim 1, wherein intensity of components of both the echo of the interrogation signal and the response signal placed in a frequency band other than the receiving frequency band is suppressed in the filtering unit to produce the filtered response signal.

3. A radar device according to claim 1, further comprising:
   a fixed attenuator for receiving a part of both the echo of the interrogation signal and the response signal from the circulator unit and sending the part of both the echo of the interrogation signal and the response signal to the signal receiving unit,
   wherein intensity of components of the other part of both the echo of the interrogation signal and the response signal placed in almost the same frequency band as that of the interrogation signal is suppressed in the filtering unit to produce the filtered response signal, the image signal is produced from the filtered response signal in the signal receiving unit, and the part of both the echo of the interrogation signal and the response signal sent from the fixed attenuator and the position indicating signal are combined with each other in the signal receiving unit.

4. A radar device according to claim 1, further comprising:
   a fixed attenuator for receiving a part of both the echo of the interrogation signal and the response signal from the circulator unit and sending the part of both the echo of the interrogation signal and the response signal to the signal receiving unit,
   wherein intensity of components of the other part of both the echo of the interrogation signal and the response signal placed in a frequency band other than the receiving frequency band is suppressed in the filtering unit to produce the filtered response signal, the position indicating signal is produced from the filtered response signal in the signal receiving unit, and the part of both the echo of the interrogation signal and the response signal sent from the fixed attenuator and the position indicating signal are combined with each other in the signal receiving unit.

5. A radar device according to claim 1, further comprising:
   a variable attenuator for receiving a part of both the echo of the interrogation signal and the response signal set to an adjusted electric power level from the circulator unit and sending the part of both the echo of the interrogation signal and the response signal to the signal receiving unit to adjust an electric power level of the other part of both the echo of the interrogation signal and the response signal sent from the circulator unit to the filtering unit,
   wherein intensity of components of the other part of both the echo of the interrogation signal and the response signal placed in almost the same frequency band as that of the interrogation signal is suppressed in the filtering unit to produce the filtered response signal, the position indicating signal is produced from the filtered response signal in the signal receiving unit, and the part of both the echo of the interrogation signal and the response signal sent from the fixed attenuator and the position indicating signal are combined with each other in the signal receiving unit.

6. A radar device according to claim 1, further comprising:
   a variable attenuator for receiving a part of both the echo of the interrogation signal and the response signal set to an adjusted electric power level from the circulator unit and sending the part of both the echo of the interrogation signal and the response signal to the signal receiving unit to adjust an electric power level of the other part of both the echo of the interrogation signal and the response signal sent from the circulator unit to the filtering unit,
   wherein intensity of components of the other part of both the echo of the interrogation signal and the response signal placed in a frequency band other than the receiving frequency band is suppressed in the filtering unit to produce the filtered response signal, the position indicating signal is produced from the filtered response signal in the signal receiving unit, and the part of both the echo of the interrogation signal and the response signal sent from the fixed attenuator and the position indicating signal are combined with each other in the signal receiving unit.

* * * * *